(12) United States Patent
Scharfman et al.

(10) Patent No.: US 6,611,805 B1
(45) Date of Patent: Aug. 26, 2003

(54) SYSTEM FOR MAKING FOOD PRODUCTS

(75) Inventors: Paul Scharfman, Madison, WI (US); James W. Purcell, Wapun, WI (US); Matthew D. Smith, Watertown, WI (US)

(73) Assignee: Specialty Cheese Company, Inc., Lowell, WI (US)

( * ) Notice: Subject to any disclaimer, the term of this patent is extended or adjusted under 35 U.S.C. 154(b) by 0 days.

(21) Appl. No.: 09/416,727

(22) Filed: Oct. 13, 1999

(51) Int. Cl.$^7$ .................................................. G06F 17/60
(52) U.S. Cl. ........................... 705/1; 435/262; 426/36
(58) Field of Search ............................... 705/1, 7, 8, 11; 700/95, 96, 117, 207; 426/17, 36–40

(56) References Cited

U.S. PATENT DOCUMENTS 5,630,070 A * 5/1997 Dietrich et al. ................. 705/8

FOREIGN PATENT DOCUMENTS

DE 4009408 A1 * 3/1990 ............. D21J/3/00

* cited by examiner

*Primary Examiner*—James P. Trammell
*Assistant Examiner*—John Winter
(74) *Attorney, Agent, or Firm*—Alan D. Kamrath; Rider Bennett, LLP

(57) ABSTRACT

A system is disclosed for reducing costs associated with making a plurality of food products incompatible in a single food product-making facility by a plurality of food product makers. A plurality of discrete food product-making plants are provided configured for use by the plurality of food product makers. A common area facility includes facilities sharable by the plurality of food product makers using and occupying the plurality of food product making plants. The plurality of food product making plants and common area facility are operated cooperatively by sharing use and costs associated with use of the common area facility by and among the plurality of food product makers.

16 Claims, 1 Drawing Sheet

SYSTEM FOR MAKING FOOD PRODUCTS

BACKGROUND OF THE INVENTION

Field of the Invention

The invention pertains to making food products. More particularly, the invention relates to a system for facilitating making a plurality of different food products by a plurality of different food product makers at a single locale, even when two or more of the food-making processes are incompatible. In further particularly, the invention relates to a system for facilitating making a plurality of different cheeses by a plurality of different cheesemakers at a single location, even when two or more cheesemaking processes are incompatible due to a possibility of cross-contamination of one process by microbes present in another, affecting cheese product quality, or by the need to maintain separate and confidential the proprietary information, processes, equipment, know-how, and other trade secrets, etc. of different cheesemakers.

The invention is best illustrated in the context of the manufacture of specialty cheeses. In this context specialty cheeses will be understood to be any of numerous varieties known or which will be developed which have distinctive properties and/or distinctive methods of production associated with them. Specialty cheeses have traditionally been produced in relatively small, separate facilities, rather than in larger, shared facilities.

It will be appreciated that cheesemaking is both art and science. As mentioned, many cheesemaking processes, ingredients, equipment modifications and other know-how are proprietary. They are maintained as trade secrets by the cheesemakers who use them in exercising their own special "artistic" and technical skills. This argues for the maintenance of separate physical plants, even though considerable disadvantage in production costs due to the small scale of many if not most of such plants is a result.

Moreover, cross-contamination of cheeses by microorganisms is problematic, and also has conventionally supported maintaining separate facilities. Contamination of a cheesemaking vat by a bacterium associated with production of one or more other and different varieties of cheese is very undesirable. As an example, it is often the case that yeast is found to be present on Feta cheese as the curd develops acidity in the make room. Often this yeast is acceptable, as the Feta will be immersed in brine before consumption. But the yeast can become airborne and can be detrimental to the manufacture of other varieties of specialty cheese. Likewise, otherwise benign cheese culture can cross-contaminate different cheese varieties causing unacceptable finished product. As an example, cheddar cheese culture can become resident in and on walls and ceilings, and can travel to subsequent cheese vats via small, even mist-like, water droplets. This can cause variation in the ratio of coccus to rods in a particular vat after the addition of cheese culture used to make other specialty cheeses. The change in starter culture can result in an unacceptable cheese end product. This problem is especially troublesome if the subsequent vat(s) of cheese are intended to not have any starter culture at all.

Furthermore, another reason specialty cheeses conventionally are made in separate, small, and often less than optimally efficient facilities is that the specialty cheesemaker often needs to have no time limitations to access and use of the facilities. Known conventional shared cheesemaking facilities usually require careful scheduling of use of the facilities, which is anathema to specialty cheesemakers, who often need to extend the time required to make or cure their cheeses. Moreover, product quantities are in some cases relatively small, and attempting to produce a specialty cheese in a conventional facility is often not viable because there is not enough volume to fill the capacity of the large facility.

Most specialty cheeses made in large facilities are made under conditions where cheesemakers have had to share the facility with makers of other cheese varieties. This often results in compromised quality. As will be appreciated, when makers of different varieties of cheese share a facility, the greater the difference between varieties, the less chance there is that trade secrets will be compromised. However, the chances that the product will be adversely affected by cross-contamination generally increases with increased difference between cheeses made. Therefore, prior schemes of sharing facilities have inherent conflicting objectives.

These considerations have conventionally required maintenance of separate plants by specialty cheesemakers. This has formerly been the case however small and inefficient the facilities were. In recent years, increased pressure to reduce production costs has been placed on specialty cheesemakers due to rising global competition. Today, in general, specialty cheeses made at small facilities still maintain a quality advantage over similar cheeses made at larger factories, but production costs at smaller plants require a higher selling price, and cheeses made in larger factories enjoy a manufacturing cost advantage enabling a lower price which threatens continued viability of higher quality specialty cheese production.

SUMMARY OF THE INVENTION

It has been recognized that the opportunity to share facility and administrative costs holds significant advantages for relatively small cheesemaking entities. However, until the present invention, a workable way to obtain these advantages without risking compromise of cheese product quality by use of a shared facility was not known.

The invention concerns a system for reducing costs associated with making a plurality of food products incompatible in a single food product-making facility by a plurality of food product makers, comprising: 1) providing a plurality of discrete food product making plants configured for use by the plurality of food product makers; 2) providing a common area facility comprising facilities sharable by the users of the food product making plants; 3) occupying the plurality of food product making plants by the plurality of food product makers; 4) operating the plurality of food product making plants and common area cooperatively; and 5) sharing use and costs associated with use of the common area facility by and among the plurality of food product makers.

In another and more detailed aspect, the invention provides a system for creating and operating a specialty cheesemaking cooperative facility, comprising: 1) a plurality of specialty cheesemaking plants, each separated from each other so as to prevent cross-contamination by microorganisms, each specialty cheesemaking plant being enabled to make cheese different from each other; and 2) a common plant facility facilitating cheesemaking at each of the plurality of specialty cheesemaking plants, comprising facilities sharable by the plurality of specialty cheesemaking plants, whereby facilities and costs sharable are shared and costs of cheese making are reduced.

Further aspects, features and advantages of the system in accordance with the invention will be apparent with reference to the following detailed description and the appended drawings, which illustrate by example principles of the invention. However, it will be understood that these are given by way of example, and not by way of limitation.

DESCRIPTION OF THE DRAWINGS

These and further aspects and advantages of the present invention will become clearer in light of the following detailed description of an illustrative embodiment of this invention described in connection with the drawings.

Figure 2:
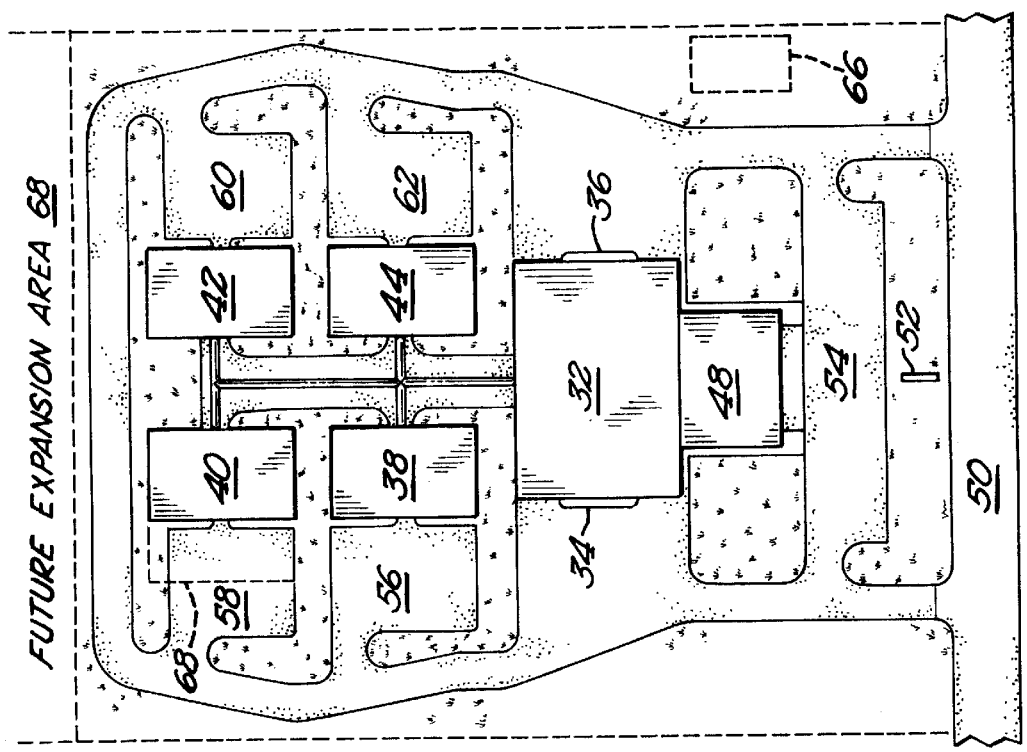
FIG. 2 is a plan view of an exemplary specialty cheese food manufacturing facility.

The illustrative embodiment may best be described by reference to the accompanying drawings where:

DETAILED DESCRIPTION OF THE PREFERRED EMBODIMENT(S)

A food making system in the most preferred form of a cooperative cheese making system according to the preferred teachings of the present invention is shown in the drawings and generally designated 10. The system 10 includes shared facilities and common areas 12, which can include for example real estate, buildings, equipment, and other facilities, as well as personnel that can be shared as to use and associated costs. The illustrative embodiment of the system 10 includes both a facilities configuration and a method of doing business for improving efficiencies among participants in a cooperatively owned and managed specialty cheese production facility, while maintaining or improving the quality of the cheeses produced by the participant cheesemaking entities. The first aspect of the invention, the physical plant, will be discussed, then the second aspect comprising the methods of organizing and managing the system 10, including business aspects of these endeavors. The opportunity to share facility and administrative costs is significant in that manufacturing costs to each participant are reduced due to economies realized, and further, additional advantages of the system based on synergy arising from locating two or more cheesemakers together will be discussed below.

Individual cheesemaking entities will occupy and operate discrete, separate and individually controlled cheesemaking plants A, B, C and D (14, 16, 18, 20, respectively). For the sake of convenience, each of these will be referred to as a plant, but other terms could describe them, such as a "condominium," "Co-op" and other terms arising out of the organization and ownership of the system 10 facility. Additional plants E through X, or more can be added if supportable by the shared facilities and common areas 12. Two to four plants are currently thought to comprise a good number range to take advantage of economies of the system but not make the system over-difficult to cooperatively manage and coordinate activities in its operation.

The individual cheesemaking plants A–D (14, 16, 18, 20) are separate buildings in a currently preferred embodiment, each under a separate roof. This in effect quarantines the plants, which contain the pasteurize/make, curing and packaging facilities, specialized ingredients and equipment of the respective cheesemaking entities, and the like, and prevents cross-contamination by microorganisms. Separate clothing changing and locker facilities, entrances, break rooms, even employee parking lots, can be provided, to minimize the probability of cross-contamination from contact between personnel from different plants. In this way, all participants can maintain confidentiality of trade secrets and other proprietary information, materials, and equipment, and make their respective unique cheese products adhering to their own make procedures and curing patterns, with their personnel following procedures to keep apparel segregated and plant facilities sanitized and/or isolated from contamination. As an example, the system is particularly effective if one or more of the participants will use their plant to produce surface ripened or high (over 5.6) pH cheeses, particularly if one or more of these high pH cheese products does not employ a starter culture.

Facilities and common areas 12 which can be shared without compromising quality of the products include features common across the cheesemaking industry, and which can be separable and segregated from cheesemaking operations to prevent cross-contamination by microorganisms, are shared and utilized by all participants according to an agreement 13 between participants. Possible conflicts are minimized by rules agreed upon, and by reason of the increased capacity of facilities made possible by joint participation in their cost. Examples of such facilities include things such as a refrigeration plant, which can be used in cooling whey, cooling raw milk intake facilities, finished product storerooms and the respective plants 14, 16, 18, 20, as needed, for example by closed recirculation of chilled water or brine through heat exchangers, or circulation of a working fluid in a distributed refrigeration system. In this connection whey cooling, though desired, is often not economically practicable at the smaller scales of individual plants otherwise available to the participants.

Sharing the cost of a plant General Manager, and other administrative costs such as employee benefit administration, permitting, licensing, inspection, and the like, is very beneficial. Shared costs of utilities 24 connection, such as water, power and telephone, and volume discounts obtainable, are advantageous. Individual metering for separate assessments for usage can still be done however. Further sharing the costs associated with waste disposal and sewerage 26, for example costs of sewer connection and of constructing and operating a wastewater pre-treatment plant to remove fat from waste, is also advantageous. Furthermore, facilities for raw milk 28 intake, segregation and storage can be shared; and these would allow different kinds of milk to be separately stored for use (e.g. milk from different animal species, or milk from cows supplemented or not supplemented with growth hormones, etc.). Shared whey tankage, dry goods storage, finished goods cold storage, ice banks, boiler, steam pipe, or other heating plant facilities, and on-site electrical control panels and facilities, a repair shop, and a finished product 30 shipping dock can be shared. Moreover, access road, parking lot, and building and grounds maintenance can be shared.

Also, the system 10 can take advantage of a shared labor pool, both for functions common to all and shared between cheesemaking entities, but also for accommodating fluctuations in demand, so long as confidentiality and cross-contamination problems are addressed. Moreover, the potential of sharing outbound freight charges for shipment to customers of the respective participants whose receiving facilities are near to one another, or along a common route, prorating of charges between participants for volume and distance differences being possible to ensure fairness. Volume discounts for needed materials and supplies may be obtainable which would be unobtainable by individual participants. Moreover, signage, advertising, a common business office, an on-site retail outlet facility, and other facilities can be shared, and better quality in all aspects of the operation shared by participants is possible because more than one participant will be contributing to the cost attending providing such increased quality.

Moreover, as mentioned, this invention is particularly helpful to a group of cheesemakers who manufacture cheeses over a certain pH, and yet want to share facility/administrative costs. For example Hispanic cheeses over 6.0 pH, Feta cheese, blue-veined cheeses, surface ripened brick cheese, Havarti cheese, Muenster cheese, and cheeses with high levels of acidity such as Cotija and Parmesan would be problematic in a shared facility, but are facilitated by the system 10 in accordance with the invention. Having a cooperative or jointly maintained portion of the system 10 facility, as well as multiple "outlying" plant buildings 14, 16, 18, 20 housing each discrete participating cheesemaker's proprietary process, enables cost savings discussed above to be realized even when cheeses which would be problematic in a shared manufacturing environment are involved.

Raw milk 28 from the individual participant cheesemaker's own preferred sources can be delivered to the particular plant 14, 16, 18, or 20 by a variety of means. A wheeled tank conveyance connectable to a storage tank in the common area 12 and an intake pipe of a storage tank at the individual plant can be used, or a permanent or re-configurable pipe conduit connection (not shown) could transport the raw milk from storage in the common area to the plant. Moreover, in another embodiment, the milk receiving facilities of the shared facilities 12 can include means to pump raw milk being received at the facility directly to a storage tank in the participant's plant via a permanent pipe conduit. Finished products can be carried via a wheeled conveyance from the plant of origin to a common cooler storage area shared by all participants, and can be then shipped from a common shared shipping facility.

Optimally, the system 10 plant will include easily accessible below ground corridors or above-head conduits for piping, powerline runs, steam lines, coolant conduit pipes etc. This is so that the piping and connections required for implementing the common facilities benefit to the cheesemaking plants 14, 16, 18, 20 can be implemented through conduits updated and maintained more easily.

Moreover, flexibility for the individual cheesemaking entities is also a feature of the invention. The discrete plants 14, 16, 18, 20 provide workspace that the individual cheese making entity can design, modify to customize to particular operations, and expand. Each building is designed so that each of the participant cheesemaking entities can pasteurize, or heat-treat, their milk in their own preferred manner, then coagulate the curd with their own cultures in their own manner, then form, cure and even package the cheese in their own manner.

It is possible for two or more participants to share plant facilities 14, 16, 18 or 20 for making compatible products, and likewise an individual entity might be able to share their facility with another cheesemaker not a party to the original agreement 13, if this is provided for by agreement among the participants. Considerable care in planning and drafting for, and around, future contingencies is indicated.

In one embodiment, the participants can own their respective plants. This gives maximum freedom for individualization within each plant. In another embodiment, a legal entity owned by the participants, or a partnership of the participants, owns the plants and grants occupancy rights to the participants under terms and conditions set forth in the agreement 13 between the participants. In either embodiment, the possibility of leasing a plant to a $3^{rd}$ party not originally participating in the organization and construction of the plants and common areas of the cooperative system 10 upon terms and conditions agreed upon by participants is inherent. Moreover, the Agreement may provide for expansion in the case of either of these embodiments, to include for example additional participants or to construct facilities to be leased to $3^{rd}$ parties. The Agreement is discussed further below.

With reference now to FIG. 2, an example of one of the many possible implementations of the invention comprises a common area factory building 32 where facilities and equipment shared in common is located. A raw milk receiving area 34 is located on a first side of the building, while a finished product shipping area and a loading/unloading dock 36 is located on a second side. In another embodiment, both can be located on the same side of the common area factory building. In another embodiment of the invention a plurality of common area factory buildings (not shown) are provided each comprising different functions. The common area factory building(s) contains the facilities shared by participants, as discussed above and may include one or more discrete specialty cheesemaking plant, as long as such plant does not compromise quality of the products of other plants and does not raise other conflicts.

Individual plant buildings 38, 40, 42, 44 used by the participants are located adjacent the common area factory building 32. They can be connected thereto by underground or aboveground conduits 46 configured to contain steam lines, electrical and telephone cabling, water lines, waste disposal lines, washable milk delivery lines, computer network cabling, air conditioning working fluid or chilled fluid lines, etc. The conduits are configured for easy access for maintenance and reconfiguration and modification. This enables the functioning of the individual buildings as plants for the participant cheesemakers as discussed above.

An office/retail store 48 can be provided, as mentioned, and is located prominently adjacent an access road 50, which in the case of a retail establishment is preferably a public street or highway. A sign 52 is provided adjacent the access road. A visitor/customer parking lot 54 is provided adjacent the office and/or retail store 48. Paved access is provided to the milk intake facilities 34, loading/unloading dock 36, and plant parking areas 56, 58, 60, 62 adjacent individual plants 38, 40, 42 and 44 respectively. The latter provide separate parking for employees of the respective plants.

A paved walkway 64 connects the individual plants 38, 40, 42, 44 with the common area factory building 32. This allows transport of wheeled tanks of milk, whey, etc., carts carrying finished products, delivery carts etc. between buildings. A walkway cover (not shown) can be provided to provide protection from precipitation and reduce the need for, snow removal in locations receiving snowfall.

In one embodiment, a separate building is provided to house a waste pretreatment facility 66 used by all participants. In this embodiment, all waste products are diverted from passing back to the common area building 32. Extra space 68 for building can be provided to accommodate future expansion of individual buildings (40, for example) and the entire factory, by adding additional individual plant buildings and/or additional common area factory buildings (not shown). While it is currently contemplated that 2 to 4 individual plants to one set of common area facilities is a good ratio for effective and economical functioning of the system 10, additional plants are possible, and with future changes in technology a different ratio may be preferred.

Moreover, many economies are still realized if there are two sets of building combinations such as the example shown constructed adjacent each other on the same site. Therefore, two common area factory buildings 32 would each support 2 to 4 individual plants 38, 40, 42, 44, for a total of 4 to 8. These can be built and/or managed cooperatively to share what resources can be shared. For example, milk delivery to two intake facilities on the same site should not incur an extra delivery charge, for example. The same is true for pick-up of finished products for shipment. Land, utilities, sewerage capitalization, construction, maintenance, and other costs can still be shared.

Nevertheless, it is not necessarily true in every case that the common area facilities, such as the common area building 32, the retail store and/or office 48, etc. be located adjacent to the individual plant buildings 38, 40, 42, 44, or one another, on the same piece of real property. While they do need to be close to one another so that costs of transporting raw materials and finished products are not excessive, many facilities can be shared even if not located on contiguous parcels of real property. One or more individual plant buildings could be located down the street or even across town and still use the shared facilities of the common area building to some extent, though direct connections of piping and cabling would not be possible in most cases. By transporting raw milk and finished products the short distance required savings can still be realized. In this way the system might be adapted to several discrete plants in a town wishing to expand and upgrade sharable facilities cooperatively. The retail store can be remotely located more easily, as transport of finished products to the store is less difficult than back and forth transfer of raw materials and finished products. Nevertheless, close proximity of the buildings is optimal.

Figure 1:
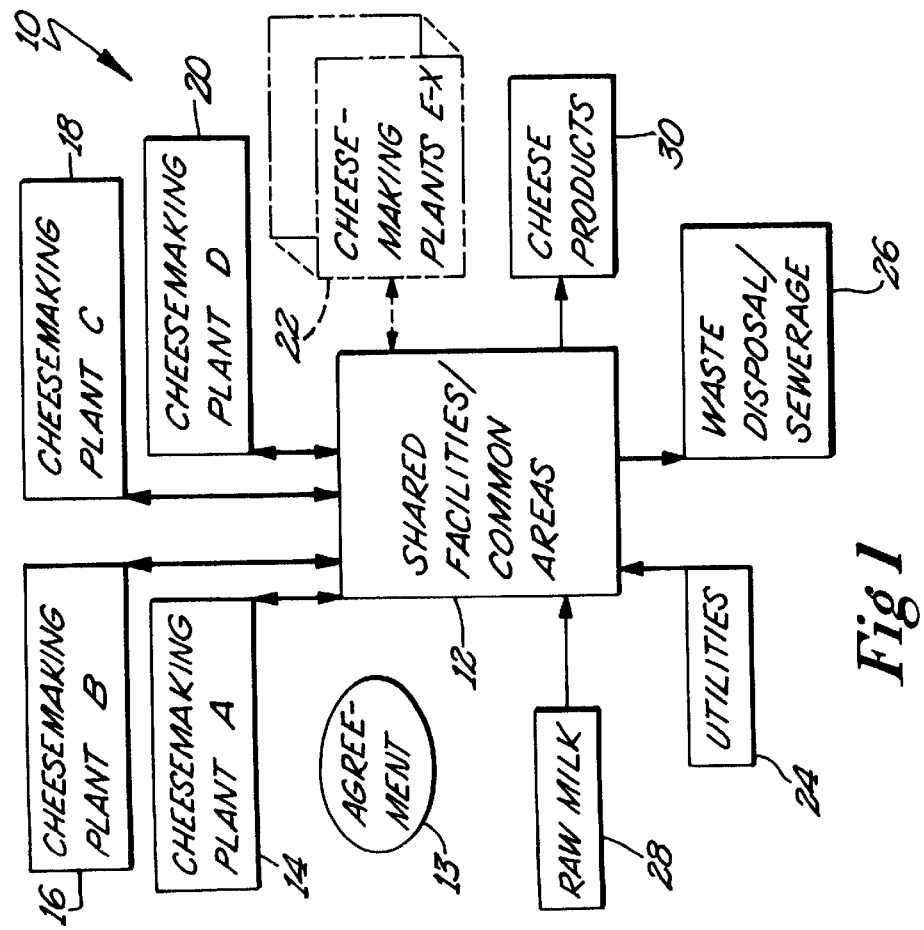
FIG. 1 is a schematic diagram illustrating a system for making cheese in accordance with principles of the invention in one embodiment.

With reference to FIGS. 1 and 2, by sharing common areas and facilities 12 as noted above, a participant in the cooperative system will reduce their capital and operating costs dramatically. As an example, for a small (say, less than 30,000 square feet) cheese factory to be erected, the cost per unit of product output capacity are nearly if not completely prohibitive. This is borne out by the fact that almost no such small factories are being built at the present time.

By sharing common areas and facilities 12, the capital costs can be reduced by about thirty percent. The square footage required by participants can be reduced by about fifty percent. The cost per square foot is higher in the make, curing, and packaging rooms than in mechanical and other common areas, and so the reduction in square footage does not directly correspond to reduction in cost. However, operating costs are also reduced as the common area facilities enjoy a higher throughput, and hence a lower cost per unit. By sharing costs such as milk and ingredients intake, maintenance, finished goods storage, shipping, waste handling, whey handling, receptionist and at least some administrative tasks, a participant will probably reduce its costs by approximately 3–7 cents per pound of finished cheese. This is dramatic, as by comparison average specialty cheese industry final margins are presently approximately 5 cents per pound.

The organization of the cooperative effort, and the method of doing business is unique in the food industry in governance and ownership arrangements. The contractual arrangements governing the system can vary greatly in details of implementation, but several common elements are incorporated in each case, as will be discussed.

An analogy is possible to condominium and cooperative apartment building ownership arrangements. However, application of the ownership models and business forms in accordance with principles of the invention to food production facilities is unprecedented.

With reference to FIG. 1, in the condominium analogy model each participant owns one or more cheesemaking plants 14, 16, 18, 20. The number of plants may vary, as noted above, depending on such factors as the number of entities (individuals, or legal entities such as partnerships, corporations, etc.) wanting to participate, the number of different incompatible cheesemaking processes desired (one cheesemaking entity may want to make a plurality of incompatible cheeses in separate plants), the specific site selected, the capacities of the common area shared facilities 12 to support few or numerous discrete plants, the relative costs of scaling up such facilities for more plants or down for fewer plants, the capital each participant can contribute to the common areas 12, the relative sizes of the discrete plants, to name a few examples.

In one embodiment, each participant bears the cost of construction of their plant 14, 16, 18, or 20, 22—etc. and all interior plant equipment, fittings, furniture and other necessaries. Each can contract individually with builders and equipment suppliers. Alternatively, the cost of construction of the plants is shared, and they jointly contract for as much of the construction and equipment supply as they can, to take advantage of lower overall costs made possible by a united undertaking. The plants can be designed to be similar in construction, and employ similar materials in the structures to lower construction costs.

With reference to FIG. 2, in one embodiment each of the participants owns and maintains their own plant building(s) 38, 40, 42 or 44. In another embodiment, each owns the interior walls and all interior fittings and equipment, but the building exterior is owned and maintained as part of the common area. These embodiments illustrate the many variations in implementation that are possible. One of the advantages of the invention is the flexibility possible, while still realizing the advantages of cost sharing.

With reference to FIG. 1, however the ownership of plant areas 14, 16, 18, 20 and 22—etc. is agreed upon, joint ownership of common areas is advantageous as discussed above. This ownership can be as tenants in common, for example where each has an undivided interest in the whole. Unequal sharing of ownership and costs is also possible, for example if one participant has significantly more volume, it would be equitable for that participant to bear an increased proportion of the costs of the common area shared facilities 12. Flexibility to allow for this is possible by structuring the agreement 13 between the participants governing the cooperative system 10 to allow for change in relative cost bearing responsibility based on use. Nevertheless a salient feature of the agreement can and preferably will be that the participants do not engage in conduct harmful to the business(es) of the other participant(s). This would include providing for equitable sharing of the common area facilities even though the participants may be unequal in volume of use.

Further discussion of possible terms and conditions of the agreement 13 (preferably a written agreement) between participants for joint governance of common areas 12 is warranted. The entire system is possible and facilitated by cooperation per an agreement setting forth principles by which all parties will abide, thereby protecting the rights of each participant against each other and/or a majority of others; for example the possibility of a majority wishing to operate the common areas to the disadvantage of an individual participant is recognized and mitigated through setting forth principles and rules of operation that govern operation of the common areas. The agreement can set forth general principles, like a constitution, and provide for a governing body to promulgate rules changeable as conditions of operation change within the framework established by the general principles. Alternatively, the agreement can set forth very specific rules and procedures for operation of the common areas.

As mentioned, the agreement 13 can provide for many things, for example: future expansion, and the possibility of inclusion of 3$^{rd}$ parties in the scheme, for example by leasing one or more plants 14, 16, 18, 20, or 22—etc., and on what terms and conditions these would be allowed; provision for accumulation of capital for future needed replacement of common area facilities 12; payment of taxes, fees, regulatory compliance costs, etc.; joint management of common areas, and appointment and oversight of one or more common area management and support personnel; establishment and operation of one or more joint retail establishments on site and/or elsewhere; the nature and conduct of joint efforts in purchasing, marketing, shipping, advertising, etc., and other provisions to include as much subject matter as the participants agree to cooperate in and be bound by rules concerning. As considerable capital cost is involved in setting up the system 10, provisions for capital contributions, financing, protection of the other participants if one or more participating entities defaults on financial obligations, and other provisions used to insure continued operations are possible in the face of unforeseen contingencies can be included in the agreement.

Turning now to discussion of other forms of organization, in contrast to the condominium model the system may be structured in a way analogous to a cooperative apartment model. In this embodiment, all the participants own shares in an entity which owns the entire facility. The discrete individual cheesemaking plants 14, 16, 18, 20, and 22—etc. are leased to participant owners from the entity on terms agreed upon among participants. Rent can be paid, the rent being applied to shared costs, savings for future replacement of equipment, taxes, etc. as discussed above in connection with other embodiments. Otherwise, rent can be minimized or eliminated and other consideration given for the leaseholds. Costs are then shared in some way agreed upon by the participants.

Unequal ownership can be accommodated in this model as well. Differences in rent charged can be used to account for differences in ownership interest for example. The scheme allows for, but does not require, different positions of relative power in policy and operating decisions.

In one embodiment, one or more, or all, of the cheesemakers are not owners, but enter into long-term leases with an owner entity which can itself be owned by one or more cheesemakers or a non-cheesemaker individual or business entity. The owner entity constructs the system 10 facility, and provides for management of the common area facilities 12. The lease agreement(s) set forth the rights and obligations of the cheesemakers with regard to use of the common area facilities and provide the protections to the cheesemakers discussed above. Other variations in legal and business relationships between the various entities discussed are possible.

With regard to all embodiments, the means and freedom for cheesemaker entities to operate their own plants 14, 16, 18, 20 and 22—etc. as they need and desire to do is accorded all participants so long as they to not infringe upon the rights of other participants to do likewise. Careful structuring of the agreement(s) 13, and care and wisdom in management of the common areas 12 to meet this objective facilitates optimum functionality of the system 10. This is true regardless of the specifics of implementation.

Other than these considerations and variations, the cooperative apartment model is very similar to the condominium model. In each case, the participants share governance of the common areas 12. The participants will enter into binding agreements that will protect the rights of each participant should the majority of owners of the common areas seek to use their majority to the disadvantage of a minority of owners of the common areas. Moreover, the agreements will provide safeguards so that the majority will be protected should one or more participants elect to dishonor the agreement or otherwise endanger the continued success of the system 10. In addition, each participant will have broad authority in conduct of activities within their individual discrete cheesemaking plants 14, 16, 18, 20 and 22—etc. This individual authority being tempered by the provisions of the agreement 13, which will contain terms and conditions restricting the activities of participants potentially affecting the others by creating conditions injurious to the conduct of their operations. The agreement will be tailored to address the individual situation of each implementation, insofar as the participants choose to agree to covenant concerning it.

As will be appreciated the system 10 in accordance with the invention affords many advantages to participants in the system. At the same time, costs are reduced and facilitation of manufacture of a wider variety of products is afforded than would be the case without application of principles of the invention. While the invention has been described in terms of specific examples of specialty cheesemaking operations and ownership and business forms, these are by way of example only, and not by way of limitation. Numerous variations are possible within the spirit and scope of the invention, and it is not limited in application to this purpose or these specifics of implementation. Accordingly it is intended that the scope of the invention not be limited, except as specifically set forth in the appended claims.

What is claimed is:

1. A system for specialty cheesemaking in a cooperative facility, comprising, in combination:

a plurality of discrete specialty cheesemaking plants, separated from each other so as to prevent cross-contamination by microorganisms, with each of the plurality of specialty cheesemaking plants manufacturing a specialty cheese wherein at least one of the plurality of discrete specialty cheesemaking plants uses a process incompatible to another one of the plurality of participating cheesemaking plants; and a common plant facility connected to each of the plurality of specialty cheesemaking plants wherein the connection facilitates cheesemaking without compromising prevention of cross-contamination by microorganisms, and with the common plant facility comprising facilities sharable by the plurality of specialty cheesemaking plants, whereby facilities and costs are sharable among the plurality of participating cheesemaking plants.

2. A system in accordance with claim 1, wherein the plurality of specialty cheesemaking plants comprise separate buildings.

3. A system in accordance with claim 2, wherein the common plant facility further comprises at least the following: a cooling plant; a milk receiving facility, a product shipment facility, and a storage facility.

4. A system in accordance with claim 1, further comprising, in combination:

a written agreement wherein the participating cheesemakers agree as to terms and conditions by and under which the system is operated.

5. A system in accordance with claim 1, further comprising, in combination:

a common business office.

6. A system in accordance with claim 1, further comprising, in combination:

a retail store facilitating participants selling products made in accordance with the system.

7. A system in accordance with claim 1, further comprising, in combination:

a common pre-treatment plant facilitating waste disposal.

8. A system in accordance with claim 1, wherein the common area facilities are located on real property contiguous with real property whereon at least one of said discrete specialty cheesemaking plants are located.

9. A method of organizing a cheesemaking enterprise, comprising:

providing a plurality of discrete cheesemaking spaces and discrete access and egress appertaining thereto, separated and quarantined from one another so as to minimize the possibility of cross-contamination by microorganisms which will affect cheese made in any of the respective spaces;

providing common areas incorporating shared facilities comprising facilities sharable by the plurality of discrete cheesemaking spaces;

obtaining agreement between a plurality of discrete cheesemaking entities concerning operation of the enterprise, with the agreement allowing for independent operation of each of the plurality of discrete cheesemaking spaces, providing for independent production and sale of specialty cheese; and operating the plurality of discrete cheesemaking spaces and common areas comprising shared facilities in accordance with the agreement, enabling manufacture of a plurality of different cheeses by a plurality of different cheesemaking entities at a single location.

10. A method in accordance with claim 9, further comprising vesting ownership of the common areas jointly in the cheesemaking entities.

11. A method of manufacturing a plurality of different cheeses by a plurality of cheesemakers at a reduced cost, comprising:

providing a plurality of discrete cheesemaking plants, each plant being quarantined from the other plants so as to prevent cross-contamination by microorganisms, and each occupiable by an independent cheesemaker, providing for independent production and sale of specialty cheeses; and providing a common area plant facility configured to facilitate cheesemaking at each of the plurality of specialty cheesemaking plants by providing facilities comprising facilities sharable by each of the independent cheesemakers of the plurality of discrete specialty cheesemaking plants, whereby facilities and costs are sharable and costs of cheese making are reducible through economics realized by sharing facilities of the common area plant facility.

12. A method in accordance with claim 11, further comprising:

locating the discrete cheesemaking plants in close proximity to the common area plant facility; and connecting the discrete cheesemaking plants to the common area plant facility via at least one of the following: an electrical conduit line, a water conduit line, a coolant conduit line, and a waste conduit line.

13. A method in accordance with claim 12, further comprising providing a shared business office.

14. A method of reducing costs associated with making a plurality of cheeses by a plurality of independent cheesemakers, comprising:

providing a plurality of cheesemaking plants configured for use by the plurality of independent cheesemakers, providing for independent production and sale of specialty cheeses;

providing a common area facility comprising facilities sharable by the users of the cheesemaking plants;

occupying the plurality of cheesemaking plants by the plurality of independent cheesemakers;

operating the plurality of cheesemaking plants and common area cooperatively; and sharing use and costs associated with use of the common area facility by and among the plurality of independent cheesemakers.

15. A method of reducing costs associated with making a plurality of food products incompatible in a single food product making facility by a plurality of independent food product makers, comprising:

providing a plurality of discrete food product making plants configured for use by the plurality of independent food product makers, providing for independent production and sale of food products;

providing a common area facility comprising facilities sharable by the users of the food product making plants;

occupying the plurality of food product making plants by the plurality of food independent product makers;

operating the plurality of food product making plants and common area cooperatively; and sharing use and costs associated with use of the common area facility by and among the plurality of independent food product makers.

16. A method in accordance with claim 15, further comprising making a cheese food product.

* * * * *